July 4, 1967
T. TROGDON
3,328,847
FOAM RUBBER APPARATUS
Original Filed Oct. 23, 1963
2 Sheets—Sheet 1
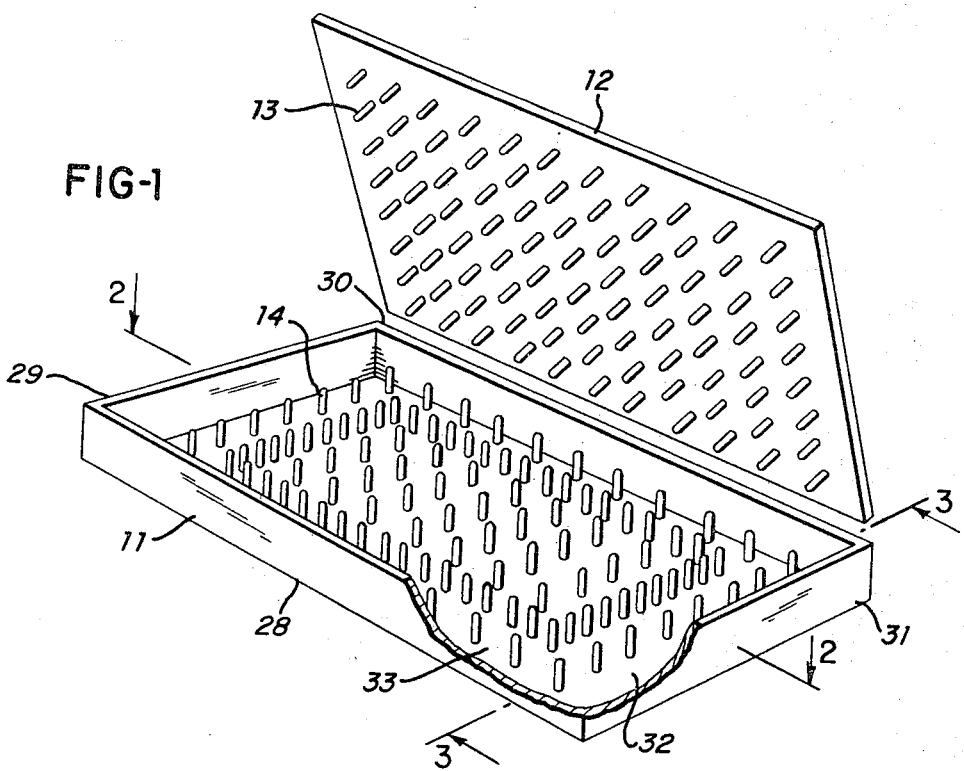
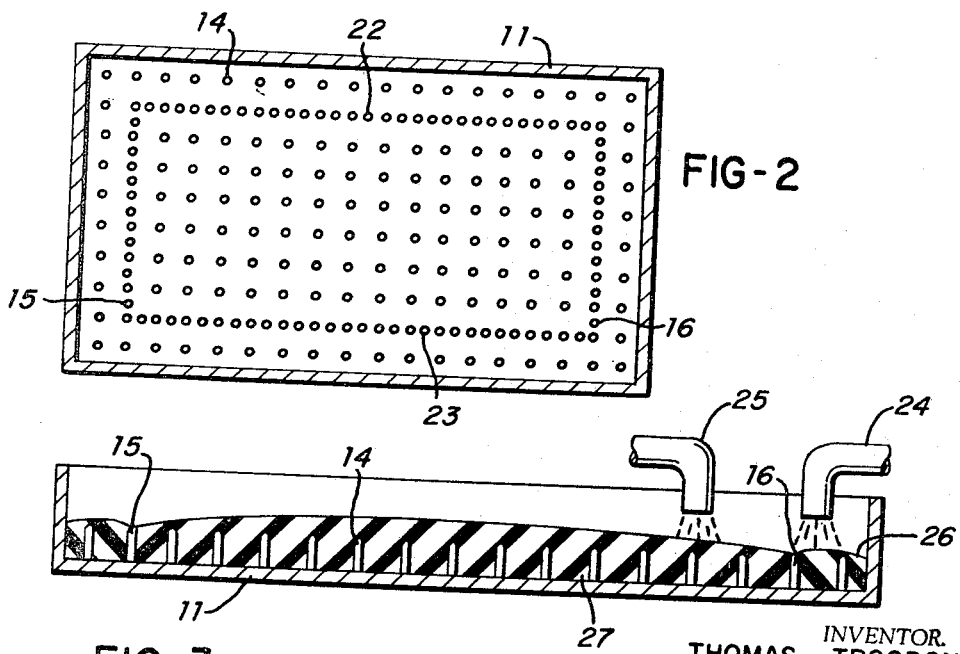
INVENTOR.
THOMAS TROGDON
BY
Reuben Wolk
ATTORNEY July 4, 1967  T. TROGDON  3,328,847
FOAM RUBBER APPARATUS
Original Filed Oct. 23, 1963  2 Sheets-Sheet 2

INVENTOR.
THOMAS TROGDON
BY
Reuben J Wolk
ATTORNEY

United States Patent Office 3,328,847
Patented July 4, 1967

3,328,847
FOAM RUBBER APPARATUS
Thomas Trogdon, Waynesville, N.C., assignor to Dayco Corporation, a corporation of Delaware
Original application Oct. 23, 1963, Ser. No. 318,366. Divided and this application Sept. 16, 1966, Ser. No. 592,244
6 Claims. (Cl. 18—39)

This application is a division of U.S. application Ser. No. 318,366, filed Oct. 23, 1963, now abandoned.

This invention relates to an apparatus for manufacturing unitary foam rubber articles, and more particularly to such articles as mattresses, pillows, furniture cushions, automobile seat cushions, and the like.

Articles of this nature are normally manufactured by the use of metal molds having upper and lower mold members, the lower member having a cavity in which the mold is partially filled with a liquid rubber latex composition that is foamable; that is, has been compounded to permit foaming. The foamed material is subsequently coagulated and vulcanized as more fully described in United States Patent No. 2,432,353, one of the series of patents which describes the so-called Talalay process. The mold cavity and upper mold member contain a number of core pins which project into the pin cavity so that the resultant product has a number of corings extending inwardly from both surfaces.

At the present time the above-described process utitilizes a latex composition which is uniform so that the resultant product is uniform in density throughout. In many instances, however, it has been found desirable to provide a product which has dissimilar densities in various portions thereof. While such a process and product have been known in the past, it has only been accomplished by fabricating two dissimilar members and cementing them together as described, for example, in United States Patent No. 2,612,158. Such a method of fabrication has proved unsatisfactory, however, because of the extra time, expense and labor involved.

It is, therefore, a primary object of this invention to provide an apparatus for the manufacture of cushioning members which are unitary yet contain material of dissimilar density in various portions thereof.

In the practice of this invention various types of molds have been utilized in the conventional Talalay process, such as described, for example, in United States Patent No. 2,615,202. In accordance with the prior art, molds having upper and lower members and containing core pins have been previously utilized. Applicant has conceived the idea of using this apparatus for the manufacture of a product having dissimilar densities as described above, by introducing two or more latices of dissimilar densities into various portions of the mold cavity. Because of the foamable nature of these latices, they will foam within respective portions of the mold cavity and maintain separate identities during the process. In order to promote this separation of identity, the conventional apparatus is modified so that certain of the core pins in the mold cavity are increased in number to form a barrier. This is done by reducing the spacing between adjacent core pins in certain selected rows so that the resultant rows serve as barriers to prevent each of the latices from flowing out of a preselected area of the cavity, while at the same time the spacing is such that an acceptable product results. During the foaming and subsequent vulcanizing the mating edges of the foam segments will merge to form a unitary product. The invention will be more fully described in the following description and accompanying drawings, in which:

FIGURE 1 is a perspective view of a typical mold used in practicing the present invention.

FIGURE 2 is a sectional view taken along lines 2—2 of FIGURE 1.

FIGURE 3 is a sectional view taken along lines 3—3 of FIGURE 1.

Figure 4:
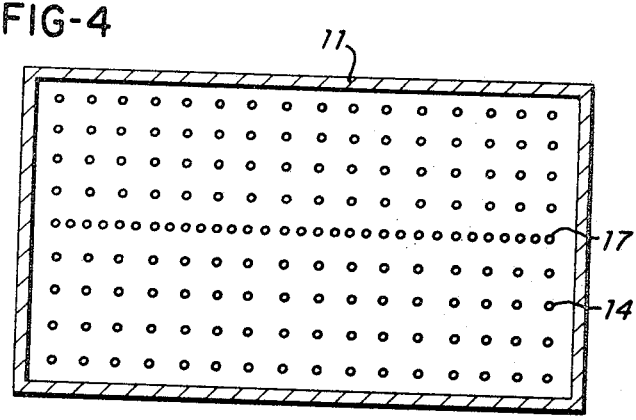
FIGURES 4, 5 and 6 are sectional views similar to FIGURE 2 illustrating further modifications of the invention.

Referring now to the drawings, FIGURE 1 illustrates a mold consisting of a lower mold member 11 and an upper mold member 12. The lower mold member 11 has four sides 28, 29, 30 and 31 and a base 32, all defining a cavity 33. On the upper surface of the base are mounted core pins 14. The upper mold member 12 also has core pins 13 mounted therein, adapted to close on member 11 in order to provide a completely enclosed mold during fabrication. As better shown in FIGURE 2, the core pins 14 in the mold cavity are aligned in rows in which the pins have an equal spacing. An exception to this spacing pattern, however, is found in the rows designated as 15, 16, 22 and 23, forming rows which are parallel to the periphery of the mold cavity. In these rows, which are designated as barrier rows, the spacing of the pins is reduced to approximately half of the spacing of the other rows.

When it is desired to fabricate the finished product, nozzles are used to introduce liquid rubber latex into the various portions of the mold. As shown in FIGURE 3, nozzle 24 provides a latex 26 of a density (preferably about 0.35 gram per cubic centimeter) which provides a comparatively firm foam member. This latex is introduced into the outer peripheral portion of the mold cavity. The nozzle 25 introduces latex 27 into the remaining portion of the mold cavity; this latex has a density of approximately 0.2 gram per cubic centimeter and provides a comparatively soft foam material. The latices are separated by the barrier rows and are thus kept from flowing together and becoming intermingled. At the same time, however, there is sufficient space between the pins in these barrier rows so that the completed foam product will not be cut into a plurality of segments by the pins. As soon as the latices have been introduced, the top of the mold is closed and the subsequent process as described in the aforesaid Patent No. 2,432,353 will take place. The latices will foam into the typical stereoreticulate structure while maintaining distinct identities. As further processing continues the foaming is completed and the finished product is subsequently vulcanized. During this time the barrier rows will tend to keep the bodies of latex apart and yet the edges of the adjacent bodies will be permitted to contact each other so that a unitary product will result. The resultant product will then be a molded foam article having a comparatively firm peripheral edge and yet completely unitary.

A modified form of the invention is illustrated in FIGURE 4 in which the barrier row 17 extends along the longitudinal center line of the mold cavity instead of the peripheral configuration of FIGURES 1 and 2. The mold construction of FIGURE 4 is otherwise like that of FIGURE 1, but the barrier row 17 will be the only one having the reduced core pin spacing. By means of this mold configuration the cavity is effectively divided into two halves so that the introduction of latices of different densities into these two halves will permit the formation of a foam rubber article having dissimilar densities in the two halves, yet which is a unitary product. This process will occur exactly in the same manner as that described above with reference to the peripheral configuration.

Figure 5:
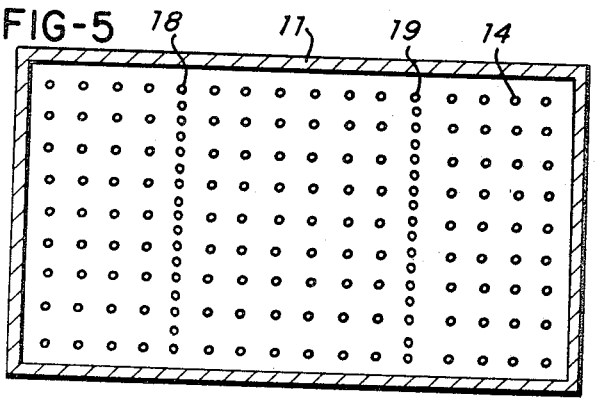

FIGURE 5 illustrates a further form of the invention in which the mold cavity contains barrier rows 18 and 19 which have the reduced spacing described above. In this case the barrier rows are located transversely of the mold cavity to define the central and end portions which are approximately equal. Of course, it is understood that the area of these segments may be any dimension in accordance with the desired end product; for example, the end portions may be smaller than the central portion. When manufacturing finished products utilizing this pattern, one latex may be introduced into the central portion and another latex into the two end portions; or three dissimilar latices may be used. In any case, the same process as described above with reference to the other configurations will take place.

Figure 6:
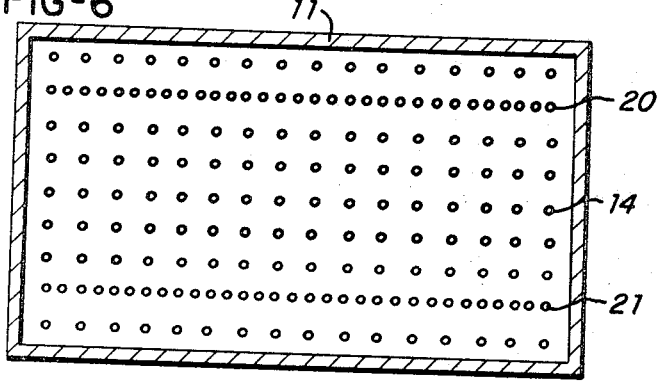

FIGURE 6 illustrates still another form of the invention in which barrier rows 20 and 21 are located longitudinally of the mold cavity to provide three longitudinal segments. The processing takes place exactly as described above, and latex of one density may be introduced into the central longitudinal portion, while latex of a dissimilar density may be introduced into the two outer longitudinal portions, or three latices of dissimilar density may be used.

Although certain forms of the invention have been described, it should be noted that other modifications are contemplated as falling within the scope of the invention. The basic principle of the invention, however, has been described in which barrier rows of core pins are located in the mold cavity to create segments of a foam material which will merge at their mating edges to create a unitary member.

What is claimed is:

1. An apparatus for the molding of unitary foam rubber articles comprising upper and lower mold members, said lower member including a base and sides cooperating to form a cavity, a plurality of spaced core pins mounted on the upper surface of said base and the lower surface of said upper member and aligned in rows, at least one of said rows having reduced spacing between adjacent pins compared to the spacing between the remaining pins.

2. The apparatus of claim 1 in which said rows of pins having reduced spacing are all mounted in the same mold member.

3. The apparatus of claim 1 in which the reduced spacing is one-half that of the spacing between remaining pins.

4. The apparatus of claim 1 in which said rows having reduced spacing extend longitudinally of said mold member.

5. The apparatus of claim 1 in which said rows having reduced spacing extend transversely of said mold member.

6. The apparatus of claim 1 in which said rows having reduced spacing extend both longitudinally and transversely of said mold member.

References Cited

UNITED STATES PATENTS

| | | | |
|---|---|---|---|
| 2,358,962 | 9/1944 | Cunningham | 264—41 X |
| 2,364,036 | 11/1944 | McKay et al. | 264—50 X |
| 2,406,589 | 8/1946 | Cunningham | 18—39 |
| 3,028,610 | 4/1962 | Talalay | 264—41 X |

J. SPENCER OVERHOLSER, *Primary Examiner.*

J. HOWARD FLINT, JR., *Examiner.*